Feb. 22, 1944.                    C. E. QUINN                    2,342,221
                        BEVERAGE REFRIGERATOR AND DISPENSER
                            Filed Oct. 20, 1942        2 Sheets-Sheet 1

INVENTOR.
Clara E. Quinn
BY Darby & Darby
Atty's.

Feb. 22, 1944.   C. E. QUINN   2,342,221
BEVERAGE REFRIGERATOR AND DISPENSER
Filed Oct. 20, 1942   2 Sheets-Sheet 2

INVENTOR.
Clara E. Quinn
BY
Darby & Darby
Atty's.

Patented Feb. 22, 1944

2,342,221

UNITED STATES PATENT OFFICE 2,342,221

BEVERAGE REFRIGERATOR AND DISPENSER

Clara E. Quinn, St. Petersburg, Fla.

BEST AVAILABLE COPY

Application October 20, 1942, Serial No. 462,723

2 Claims. (Cl. 62—91.5)

This invention relates to improvements in apparatus for refrigerating, carbonating, preserving, dispensing and transporting beverages, more particularly of the fruit juice type.

An object of this invention is to provide a combined refrigerating, carbonating and dispensing appliance for use in transporting and distributing beverages. The subject matter of the invention has particular use in dispensing fruit juices containing pulp, as, for example, orange juice.

A further object of the invention is to provide an appliance of this type in which solid carbon dioxide is employed as the refrigerating, carbonating and preserving agent.

Another object of this invention involves the use of the carbon dioxide not only for carbonating the beverage but keeping the body of the beverage agitated so as to uniformly distribute any solid contained, such as pulp, throughout the beverage body.

An additional object of the invention is to provide a mechanism in which it is possible to obtain the protective advantage of excluding oxygen from contact with the beverage body by distribution of carbon dioxide gas through the body and to gain the advantage of the preservative action thus distributed in the beverage.

Other and more detailed objects of this invention will be apparent from the following detailed description of one embodiment thereof.

This invention resides substantially in the combination, construction, arrangement and relative location of all parts, as will be described in detail below.

In the accompanying drawings.

Figure 1:
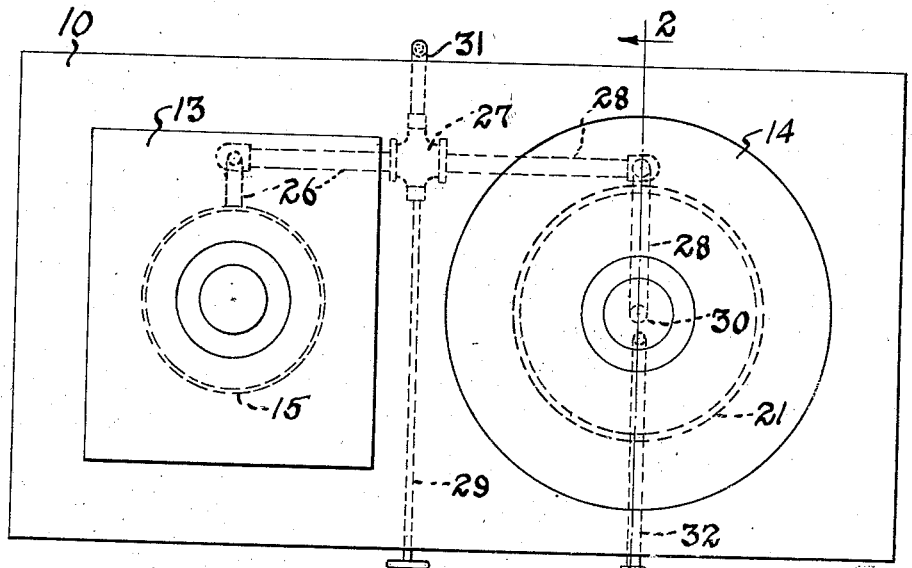
Figure 1 is a top plan view of an appliance in accordance with this invention.

The embodiment of the invention illustrated in the drawings comprises an outer heat insulating casing. It is made of any suitable heat insulating material of any desired configuration. This casing is shaped to provide two internal compartments 11 and 12 opening upwardly and having removable covers 13 and 14 for closing them and permitting access to the interior thereof. Within the compartment 11 is a metallic container 15 provided with a threaded opening in the top which may be closed and sealed by means of a threaded plug 17. The opening is sufficiently large size so that lumps of solid carbon dioxide 16 may be introduced into the container therethrough. The container 15 is surrounded by a shell 18 of suitable material, such as metal, and is in space relation with respect thereto so as to provide a chamber surrounding the major portion of the container 15. The shell 18 is sealed about the container 15 at its upper edge to form a fluid tight joint and is provided with an opening and a threaded plug 19 so that any suitable liquid secondary refrigerant S may be introduced into the space between the shell and the container so as to fill it and the cooling coil connected thereto.

The compartment 12 is lined by a metallic casing 20 within which is supported in any suitable manner a beverage tank 21 which has a conical bottom as shown. The metallic casing 20 is diagrammatically illustrated as provided with a removable cover 20' for sealing the casing to form a fluid tight compartment. Various fastening devices, well known and therefore not illustrated, may be employed for detachably securing the cover 20' to the casing 20. Likewise, the tank 21 is provided with a removable sealing cover 21' to form a fluid and gas tight tank from which the cover may be readily detached when desired. The external diameter of the tank 21 is somewhat less than the internal diameter of the casing 20 to provide space within which the helical pipe coil 22 is mounted. The lower end of this coil is secured to the secondary refrigerant supply connection 23 of the shell 18 while its upper end is similarly connected to the return connection 24. The casing 20 is provided with a drain 25 and in use the casing is partially filled with water W as shown.

Figure 2:
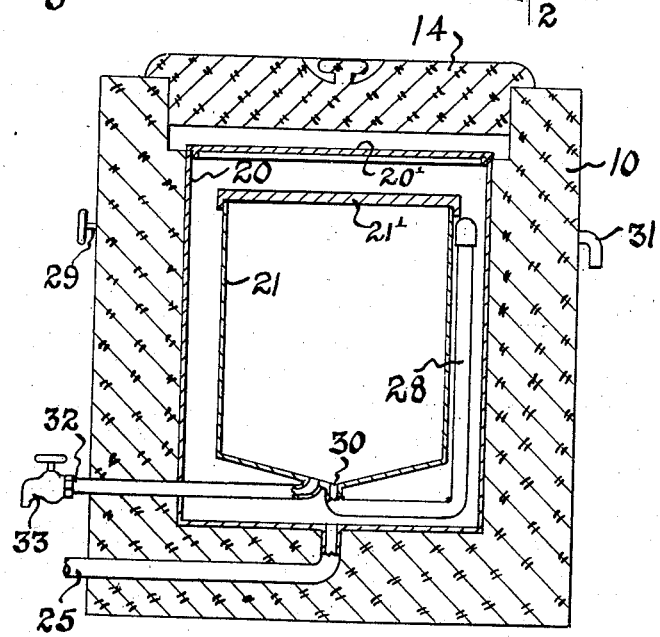
Figure 2 is a cross-sectional view taken on the line 2—2 of Figure 1.

Near the top of the container 15 is a tapped opening to which a pipe connection 26 is secured which connection extends to a valve 27. From the valve another pipe connection 28 extends to the bottom of the tank 21 and connects to a threaded central opening 30 at the apex of the conical bottom of the tank. As shown in Figure 1 a connection 31 extends rearwardly from the valve 27 to a point exteriorly of the cabinet 10. The valve 27 is provided with a forwardly extending stem 29 so as to project out of the cabinet 10 at the front and is provided with an operating handle as shown. The valve 27 may be of any well-known type suitable for the purpose. Structurally the exhaust connection 31 communicates with the gas supply side of the valve so that depending upon adjustment of the valve all the gas which cannot flow through it will simply escape to atmosphere through the connection 31. As appears clearly from Figure 2 the bottom of tank 21 is provided with beverage supply connection 32 terminating in any suitable form of valve or tap 33.

In use the container 15 is charged with a suitable quantity of solid carbon dioxide. The casing 20 is filled with water so as to submerge cooling coils 22 and the tank 20 is filled to the desired level with a beverage such as orange juice. The secondary refrigerant circulating system comprises the space between the tank 15 and shell 18 and the cooling coil 22. The secondary refrigerant absorbs heat by conduction which heat does the work in converting the solid carbon dioxide to gaseous carbon dioxide. The secondary refrigerant circulates by thermosiphonic action by moving into the bottom of the cooling coil 22 from the connection 23 and working upwardly through the coil absorbing heat by conduction from the water in which it is immersed. The water, of course, in turn absorbs heat by conduction from the body of the beverage in tank 21. The warmed secondary refrigerant returns through the connection 24 and this circulation continues in a well-known manner. The gas generated by the sublimation of the solid carbon dioxide escapes from tank 15 through the connection 26 to valve 27. This valve may be of any suitable construction and is a type which may be adjusted to discharge the desired portion of the gaseous carbon dioxide to the atmosphere through the exhaust connection 31 and the remaining desired portion through pipe 28 into the bottom of tank 21 through orifice 30.

Figure 3:
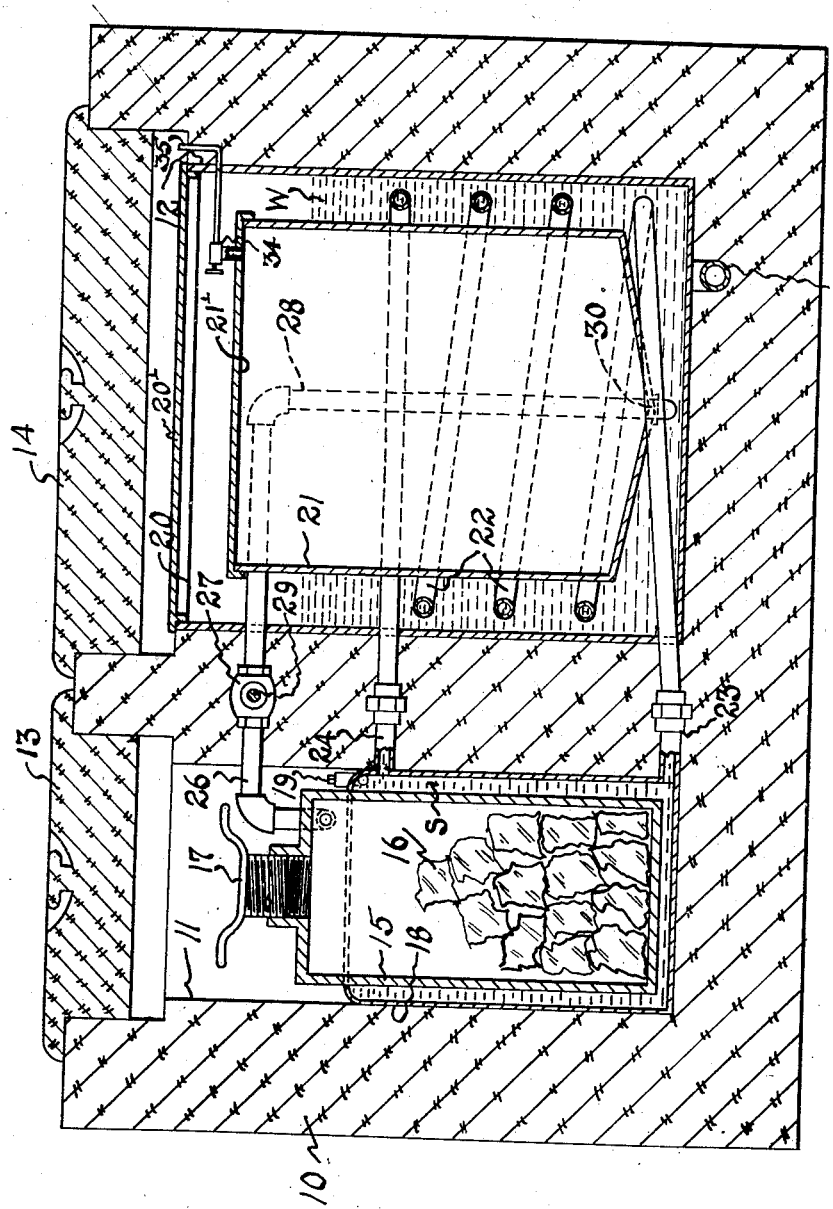
Figure 3 is a vertical central longitudinal cross-section through the structure.

The carbon dioxide gas entering through orifice 30 discharges into the bottom of the beverage keeping it in a state of constant agitation so that the pulp and other solid material therein is held in suspension. This continual motion of the beverage facilitates the rapid cooling thereof and the dispersion of the solid carbon dioxide through the beverage body. Since the tank 21 is sealed the pressure of carbon dioxide within the container can be built up by proper adjustment of the valve 27 so that at the temperatures to which the beverage is chilled, carbon dioxide gas can be dissolved in the liquid to carbonate it. If it is not particularly desired to carbonate the beverage, the tank 21 may be provided with any suitable form of relief valve so that the pressure in the tank 21 will not build up to a point where carbonation is effected. For example, as is clear from Figure 3, the sealed tank 21 may be provided with an adjustable valve 34, the outlet of which is connected by a small pipe 35 to some point exterior to the tank 20 or to the casing 10. Thus, in the event that it is only desired to employ the carbon dioxide gas for the purpose of stirring the beverage and keeping the solid matter in suspension, the valves 27 and 34 will be relatively adjusted so that the gas from the sealed container 15 will be bubbled through the beverage in the tank 21 and discharged to the atmosphere through the pipe 35 at a rate which will not build up any important super-atmospheric pressure condition within the tank 21. On the other hand, when it is desired to carbonate the beverage in tank 21, valve 34 will be closed and valve 27 adjusted so as to develop a carbon dioxide pressure in the tank 21 sufficient to carbonate the beverage at the temperature at which it is being maintained.

A further result of the introduction of the carbon dioxide gas into the beverage body is to impart its preserving ability thereto and to exclude oxygen therefrom. The result is that in the case of beverages which rapidly tend to change their color, taste and food value by oxidizing action, are kept out of contact with oxygen. In the case of orange juice tests have indicated that it retains its flavor and color under these conditions for several weeks and its valuable vitamin C content is likewise preserved.

From the above description it will be apparent to those skilled in this art that the particular embodiment of the invention illustrated herein is but one possible form thereof. I do not, therefore, desire to be strictly limited to the disclosures given herein, but rather to the scope of the accompanying claims.

What I seek to secure by United States Letters Patent is:

1. In a device of the type described the combination including a heat insulating cabinet forming two compartments opening upwardly, removable covers for said compartments, a tank immersed in water in one of said cabinets, a cooling coil surrounding said tank and immersed in the water, a double wall metallic container mounted in the other of said compartments, and connected to said coil, the space between the double wall being filled with a liquid refrigerant, and the space within the double wall container being adapted to have solid carbon dioxide sealed therein, a connection from the solid carbon dioxide space to a port at the bottom of said tank, a valve in said connection having an operating member extending exteriorly of said cabinet and another gas connection from said valve to the atmosphere whereby the quantity of gas delivered to said tank and discharged to atmosphere may be proportioned as desired.

2. In a device of the type described, the combination including an insulating casing forming at least two compartments, a sealed beverage tank immersed in a fluid in one of said compartments, a double walled sealed carbon dioxide container mounted in the other of said compartments, a cooling coil surrounding said sealed tank and immersed likewise in the fluid and connected to the double walls of said sealed container to provide a closed liquid secondary refrigerant circulating system, a pipe connection from the inner space of said double walled container to the bottom of said sealed tank including a valve, and a valve discharge connection for said sealed tank whereby carbon dioxide may be discharged into liquid contained in said sealed tank at atmospheric or super-atmospheric pressure.

CLARA E. QUINN.